Sept. 24, 1929.   A. P. LUNDIN   1,729,172
METHOD OF MAKING ELONGATED COMPOSITE UNITS OF ASPHALT AND CONCRETE
Filed Feb. 11, 1928   2 Sheets-Sheet 1
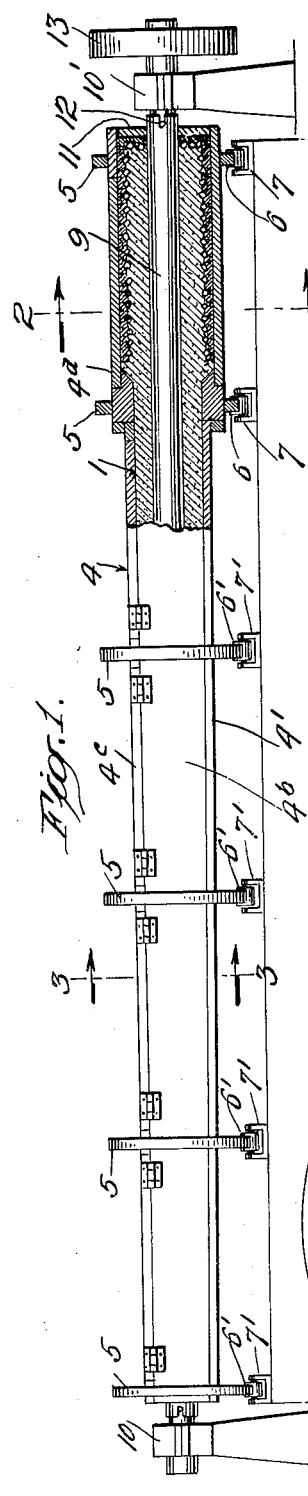
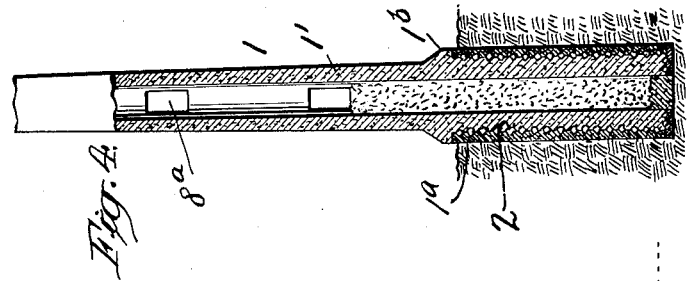
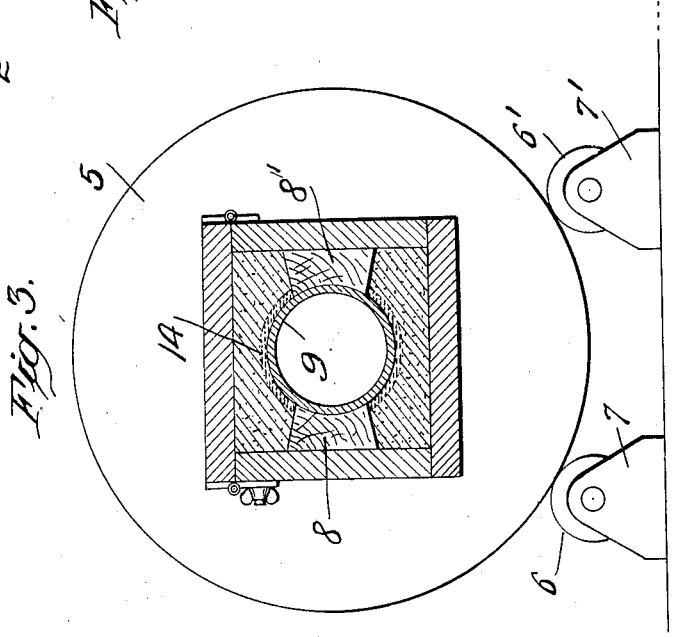
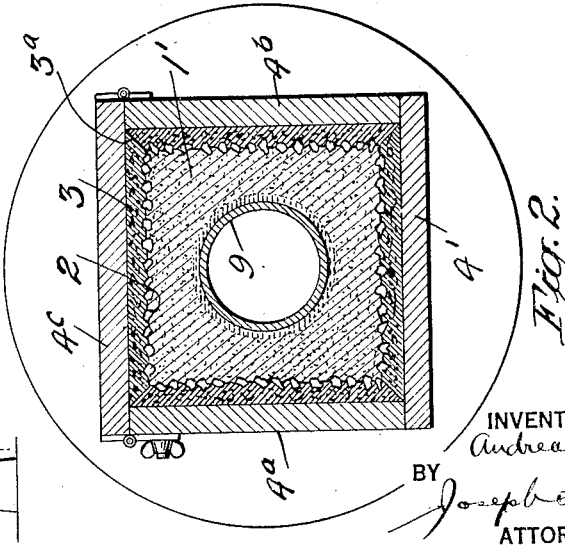
INVENTOR
Andreas P. Lundin
BY
Joseph F. O'Brien
ATTORNEY

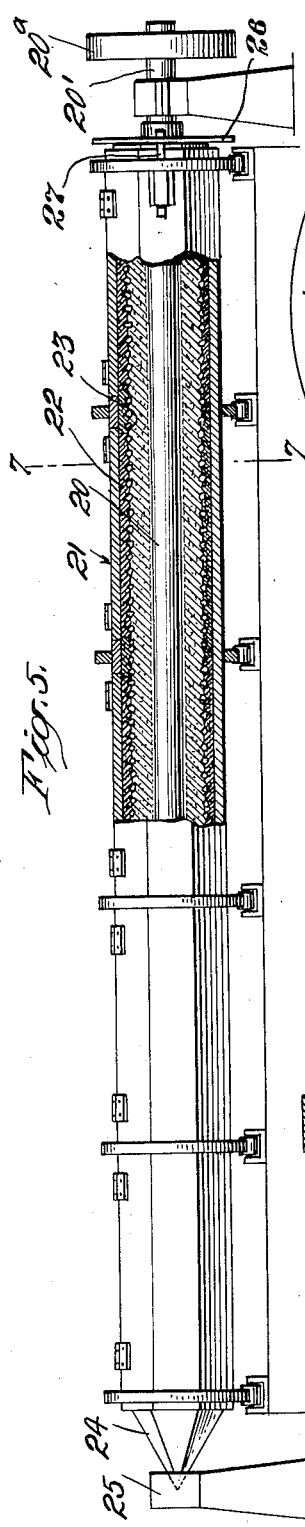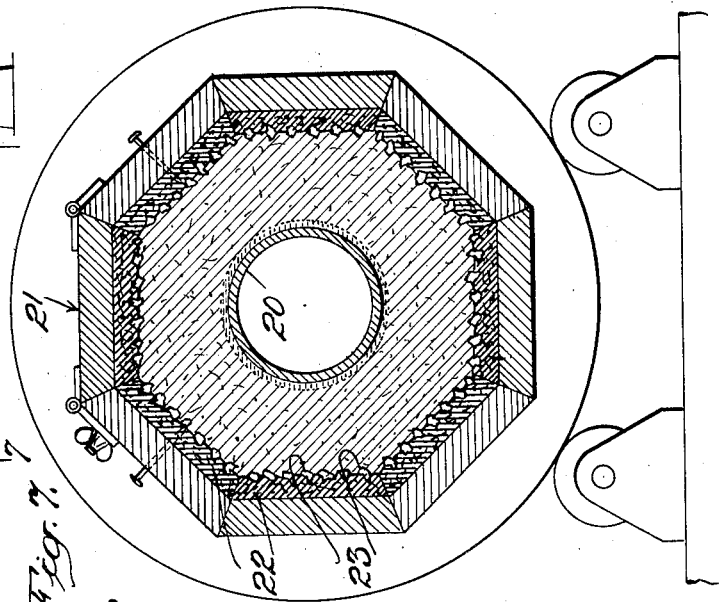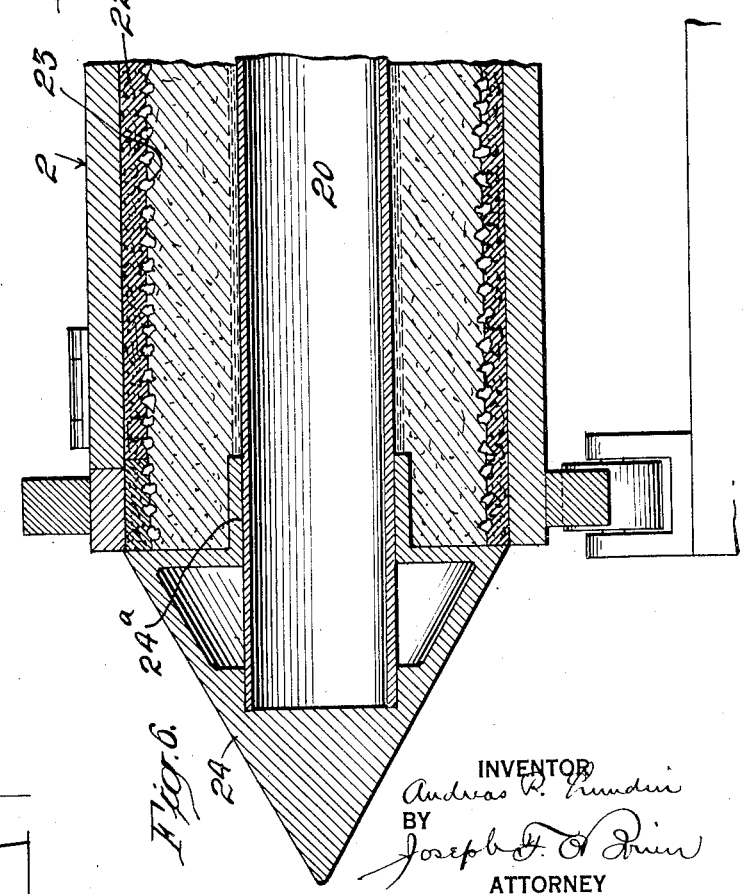

Patented Sept. 24, 1929

1,729,172

UNITED STATES PATENT OFFICE

ANDREAS P. LUNDIN, OF FLUSHING, NEW YORK, ASSIGNOR TO ASPHALTO CONCRETE CORPORATION, A CORPORATION OF NEW YORK

METHOD OF MAKING ELONGATED COMPOSITE UNITS OF ASPHALT AND CONCRETE

Application filed February 11, 1928. Serial No. 253,569.

This invention relates to improvements in methods of making elongated composite units of asphalt and concrete.

Elongated concrete units, such as poles, piles, columns, conduits and the like are frequently in whole or in part embedded in and subjected to the action of alkalies in the earth and are also frequently subjected to the corrosive action of salt water. It is desirable, therefore, that such articles be coated with an appropriate protective material adapted to withstand the corrosive action of such alkaline elements or other deleterious matter. Asphalt and other bituminous compositions have qualities which resist the action of such alkalies for a long period of time, and such concrete units have heretofore been coated or painted with asphalt. These coatings, however, have not been effectively secured to the cementitious structures and as a result have relatively slight durability and protective action on the unit.

The object of the present invention is to produce an improved coating or asphaltic outer surface for such articles and to provide an improved method of making such coated articles, in which a surfacing layer of asphalt is securely bonded to the cement concrete structure in the operation of molding the unit.

Another object of the invention is specifically to produce an improved pole, pile, or like elongated unit at a relatively low cost by securely and strongly bonding therewith in the molding operation a surfacing layer of asphalt and thereafter sealing the joints.

Another object of the invention is to add to the life and durability of elongated units by providing during the molding operation an asphalt surfacing layer which will be united to the cement body by a strong bond and also to provide a method of construction in which an asphalt surfacing layer having a strong bond with the asphalt will be molded or cast as an integral part of the unit in the manufacture thereof and will also have a strong bond with the cement concrete body.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a view, in side elevation, of a mold for a pole or like elongated article, one end of which is broken away to show, in longitudinal section, an asphalt surfaced base portion;

Fig. 2 is a section on the line 2—2 of Fig. 1;

Fig. 3 is a section on the line 3—3 of Fig. 1;

Fig. 4 is a vertical section, partly in elevation, showing a portion of a pole having the lower end or base coated with asphalt in accordance with my invention;

Fig. 5 is a view similar to Fig. 1 of a concrete pile molded in accordance with my invention;

Fig. 6 is an enlarged, longitudinal section of the front portion of the mold shown in Fig. 5; and Fig. 7 is a cross section on the line 7—7 of Fig. 5.

Figs. 1 to 4 of these drawings illustrate a preferred form of my invention and particularly my improved asphalt-surfaced pole 1 and method of manufacturing the same. Said pole 1 (Fig 4) embodies a body portion 1' formed of cement concrete which may in whole or in part be provided with a surfacing layer 1ª of asphalt concrete, and this surfacing layer is molded to the body portion during the process of manufacturing the same. As shown, the body portion and surfacing layer are secured together during the molding operation of the cement concrete portion in an elongated rotatable mold such as shown in Fig. 1. The pole 1 is provided, at the lower end, with a base portion 1ᵇ of increased dimensions which is surfaced, as shown, at 1ª with a protective, water-proof and alkali-resisting surfacing layer of asphalt concrete which is, during the process of casting or molding the cement body portion, securely bonded to the said cement body or frame by bonding elements 2 as hereinafter specified. In the preferred embodiment shown, this surfacing layer is built up of a series of slabs of asphalt concrete, asphalt mastic or like composition, the inner bonding surface of which is preferably studded with a series of such bonding elements 2 partially embedded therein and preferably comprising fragmentary mineral blocks or mineral aggregate. The bonding elements 2 are initially bonded with the asphaltic concrete or asphalt mastic slabs by partially embedding such bonding elements in the asphalt slab and during such embedding producing between the asphalt material and bonding elements a strong bond by heating the said elements to a temperature sufficient to cause a melting or fusing of the asphalt abutting the embedded portion of the elements. The slabs may be molded either of flat or of arcuate configuration and, if desired, a mold of suitable dimensions to produce a slab of the desired size, shape or configuration may be placed horizontally on the ground; the bottom of the mold may be provided with a suitable non-sticking material such as rubber, powdered stone or the like. A layer or layers of asphalt mastic or asphaltic concrete is then filled into this mold and well rammed, and preferably while the top or last layer of asphalt mastic or asphaltic concrete is still hot, the bonding elements preferably comprising mineral aggregate in a very hot condition is partially embedded and preferably embedded about one-half the size of a stone in the surface of the asphalt material. These pieces of stone or other desirable bonding elements thus embedded in hot condition in the asphaltic concrete or mastic adhere strongly, after cooling, to the asphalt mastic or asphaltic concrete. It will be understood that the mesh, size and diameter of the bonding elements will be proportional to the layer of asphaltic concrete or mastic so that the stones will be partially embedded therein and will have a clean surface free from asphalt protruding therefrom. These clean stones are utilized as bonding elements for securing or attaching these asphalt slabs to the cement body portion of the unit during the formation of molding thereof. In order to accomplish this result, the flat or rounded surfacing units are preferably made to conform with a longitudinal mold section. If, therefore, the mold is round on the interior, the asphalt unit will have a rounded outer surface and if the mold has a series of flat surfaces and is, for example, square, hexagonal or octagonal in configuration, the asphalt surfacing units will be flat and of a size corresponding to the surfaces of the article to which they are to be attached and are likewise preferably formed with mitered edges which abut against each other and are fastened or bonded together. Thus in Figs. 1 to 4, I have shown a square pole 1 being molded in a square mold and surfaced with asphalt slabs 3 having mitered or beveled edges $3^a$. These slabs 3 are positioned in the mold with their outer surfaces against the interior of the mold and their inner surfaces, which are studded with bonding elements 2 half embedded in the surface and half protruding therefrom. The top and side slabs of the asphalt-surfacing material are fastened to the mold in any suitable way such as by nails, screws or the like fastening elements and the cement concrete is thereafter filled or fed into the mold 4 thus lined with asphaltic slabs.

In the preferred form of my invention shown, I produce the body or structural part of the pole 1 substantially in accordance with the patent to Hyden, et al., No. 1,593,696, dated July 27, 1926 and utilize a somewhat similar mold to that described by said Hyden et al., patent but line the same as hereinabove specified with asphalt slabs having bonding elements 2 initially bonded to the asphalt by a strong bond preferably formed in accordance with the Bille Reissue Patent No. 16,523, dated January 4, 1927.

In Figs. 5 to 7 inclusive, I have illustrated another form of mold and apparatus for producing piles or piling in which the asphalt surfacing layer extends throughout the entire length of the article. In this case also, I have employed a rotatable core 20 rotated by a shaft 20' through a pulley $20^a$ from a suitable source of power not shown, and provide a mold 21 of hexagonal configuration but otherwise similar to the mold hereinabove described and also similar to that of the Hyden et al. Patent No. 1,593,696, but have lined this mold throughout with slabs of asphaltic material having embedded bonding elements 23 as hereinabove described. I have also provided one end of the mold with a piling point 24 bearing at its outer end in a bearing standard 25 and provided interiorly with bearings 24' and $24^a$ for one end of the core 20. This point also forms an end closure for one end of the mold and the bearing $24^a$, which is in the form of a collar, is embedded in the concrete. I have also provided means such as the spider 26 and bolts 27 at the opposite end of the mold whereby the mold may be locked and unlocked to the core to permit independent initial rotation of the core for the purposes of compacting or tamping the cement concrete and thereafter to permit a joint rotation of the mold and core to produce a further compacting by centrifugal action of the concrete and a bonding thereof with the asphalt slabs. In this case also excess water will be released by the joint rotation of the core and mold. In all cases, the core is removed as soon as possible and a curing of the piling or poles is effected in a conventional manner.

The mold 4 is formed of a series of bottom boards 4', a series of side-boards 4ª and 4ᵇ and a series of top-boards 4ᶜ suitably fastened together to produce the elongated mold 4 shown in Fig. 1. Said mold 4, as illustrated, is mounted in a series of carrier rings 5 having circular outer peripheries 5' bearing upon rollers 6, 6' mounted in supporting brackets 7, 7'.

Axially mounted within the mold is a rotatable core 9 which, as shown, is supported by ends 11 and is connected to stub-shafts 12 supported at opposite ends in bearing brackets 10, 10'. The core 9 is rotated through a pulley 13 driven from any suitable source of power not shown. If desired, the mold may have suitably mounted at varying positions along the length spacing blocks 8, 8' which assist in supporting the rotatable core, form intermediate bearings therefor and provide side apertures 8ª in the finished pole (see Fig. 4).

In making concrete poles of standard quality, the core 12 is rotated during the process of filling the mold which causes a compression of the concrete mass 1' as it is being filled into the mold and avoids the necessity of tamping the same. The mold 4 is provided with an enlarged base section 4ᵈ which is lined with asphalt slabs positioned in and suitably connected to the mold boards of said base portions as hereinabove described.

In the molding operation, the mold 4 is retained in stationary position by chocking the same in any suitable way while the core is being rotated to compact the mass in the filling thereof, and in poles of standard quality, no further compacting of the mass is necessary.

Articles of superior quality and greater density may, however, be made and in such cases, it is desirable to further compact the concrete mass. When such articles are manufactured, the chocks are removed after the mold is filled in accordance with the method hereinabove described, and the entire mold is then rotated jointly with the core, the friction between the core, mass and bearing-blocks 8 being sufficient to accomplish such rotation by a mere removal of the chocks. The core and mold are rotated at a sufficiently high rate of speed to cause centrifugal action to further compact the mass. When the mold is so rotated, the excess water collects at 14 around the core and flows out of the mold through the ends thereof.

It is desirable that the joints between the asphalt slabs on the exterior of the article be sealed and this may be accomplished in any conventional manner and preferably by the use of a hot sealing iron.

Having described my invention, I claim:—

1. A method of making elongated composite units of asphalt and concrete comprising the taking of a mold, the lining of the mold with slabs of asphalt having inner surfaces provided with bonding elements having a fused bond with the asphalt slabs and partially protruding above the surface thereof, filling cement-concrete for the said body portion through an opening in the mold and compacting the same, then applying the mold cover with an asphalt slab connected thereto, allowing the cement to set, withdrawing the core, releasing the unit from the mold and sealing the joints between the asphalt slabs.

2. A method of making elongated composite units of asphalt and concrete comprising the taking of a mold, the lining of the mold with slabs of asphalt having inner surfaces provided with bonding elements having a fused bond with the asphalt slabs and partially protruding above the surface thereof, filling cement-concrete for the said body portion through an opening in the mold and compacting the same, then applying the mold cover with an asphalt slab connected thereto, allowing the cement to set, withdrawing the core, thereafter rotating the mold to further densify the cement-concrete, releasing the unit from the mold, sealing the joints between the slabs and curing the article.

In witness whereof, I have signed my name to the foregoing specification.

ANDREAS P. LUNDIN.